US006852400B2

(12) United States Patent
Nakazawa et al.

(10) Patent No.: US 6,852,400 B2
(45) **Date of Patent: *Feb. 8, 2005**

(54) ENDLESS BELT ELECTROPHOTOGRAPHY, PROCESS FOR PRODUCING THE ENDLESS BELT, AND IMAGE FORMING APPARATUS HAVING THE ENDLESS BELT

(75) Inventors: Akihiko Nakazawa, Shizuoka-ken (JP); Hiroyuki Kobayashi, Fuji (JP); Minoru Shimojo, Kawasaki (JP); Akira Shimada, Shizuoka-ken (JP); Atsushi Tanaka, Susono (JP); Tsunenori Ashibe, Yokohama (JP); Takashi Kusaba, Shizuoka-ken (JP); Hidekazu Matsuda, Numazu (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,986

(22) Filed: Dec. 21, 1999

(65) Prior Publication Data

US 2002/0176977 A1 Nov. 28, 2002

(30) Foreign Application Priority Data

Dec. 22, 1998 (JP) .......................................... 10-365131

(51) Int. Cl.[7] ........................ G03G 15/08; G03G 15/00; G03G 15/01; G03G 15/20; B32B 27/14

(52) U.S. Cl. ....................... 428/220; 428/213; 428/215; 399/302; 399/308; 399/303; 399/312; 399/121; 399/162

(58) Field of Search ................................ 428/220, 215, 428/213, 35.7; 430/47, 62; 528/487; 399/302, 308, 121, 162, 303, 312

(56) References Cited

U.S. PATENT DOCUMENTS 5,079,121 A * 1/1992 Facci et al. .................... 430/62
5,172,173 A 12/1992 Goto et al. ................. 355/275
5,525,446 A * 6/1996 Sypula et al. ................. 430/47

FOREIGN PATENT DOCUMENTS

| | | |
|---|---|---|
| JP | 63-301960 | 12/1988 |
| JP | 3-89357 | 4/1991 |
| JP | 5-77252 | 3/1993 |
| JP | 5-269849 | 10/1993 |
| JP | 5-345368 | 12/1993 |
| JP | 9-269674 | 10/1997 |

OTHER PUBLICATIONS

Abstract, Database WPI, Section Ch, Week 199345, Derwent Publications Ltd., London GB; AN 1993–356867 (Oct. 12, 1993) (corresponding to JP 5–261839).

Abstract, Database WPI, Section Ch, Week 199304, Derwent Publications Ltd., London GB; AN 1993–033510 (Dec. 15, 1993) (corresponding to JP 4–362981).

Abstract, Database WPI, Section Ch, Week 199228, Derwent Publications Ltd., London GB; AN 1992–232049 (Jun. 2, 1992) (corresponding to JP 4–159560).

Abstract, Database WPI, Section Ch, Week 199209, Derwent Publications Ltd., London GB; AN 1992–353386 (Sep. 10, 1992) (corresponding to JP 4–255332).

Abstract, Database WPI, Section Ch, W ek 199731, Derwent Publications Ltd., London GB; AN 1997–338513 (May 27, 1997) (corresponding to JP 9–138517).

* cited by examiner

*Primary Examiner*—Rena Dye
*Assistant Examiner*—Lawrence Ferguson
(74) *Attorney, Agent, or Firm*—Fitzpatrick, Cella, Harper & Scinto

(57) ABSTRACT

An endless belt for electrophotography is disclosed which is obtainable continuously by melt extrusion from a circular die. The endless belt has a layer containing a thermoplastic resin having a diphenyl sulfone structure represented by the following Formula (1)

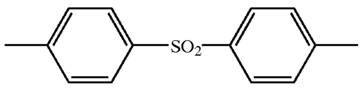

Also disclosed are a process for producing the endless belt and an image forming apparatus having the endless belt.

9 Claims, 4 Drawing Sheets

ENDLESS BELT ELECTROPHOTOGRAPHY, PROCESS FOR PRODUCING THE ENDLESS BELT, AND IMAGE FORMING APPARATUS HAVING THE ENDLESS BELT

BACKGROUND OF THE INVENTION

1. Field of the Invention

This invention relates to an endless belt for electrophotography, such as an intermediate transfer belt, a transfer material carrying belt or a photosensitive belt, a process for its production, and an image forming apparatus making use of it.

2. Related Background Art

Intermediate transfer belts, transfer material carrying belts and photosensitive belts are known as endless belts for electrophotography.

Compared with image forming apparatus in which images are transferred from a first image bearing member onto a second image bearing member (transfer material) fastened or attracted onto a transfer drum (e.g., Japanese Patent Application Laid-Open No. 63-301960), image forming apparatus making use of intermediate transfer belts have an advantage that a variety of second image bearing members can be selected without regard to their width and length, including thin paper (40 $g/m^2$ paper) and up to thick paper (200 $g/m^2$ paper) such as envelopes, post cards and labels. This is because any processing or control (e.g., the transfer material is held with a gripper, attracted, and made to have a curvature) is not required for the second image bearing member transfer material.

Image forming apparatus are also proposed which have a plurality of recording assemblies in which electrostatic latent images are formed on electrophotographic photosensitive members, the electrostatic latent images formed are developed and the developed images are transferred to a transfer material, where a full-color image is formed by transferring individual color toner images superimposingly to the transfer material while transporting it sequentially to the respective recording assemblies by means of a transfer material carrying belt.

It is also known to set up electrophotographic photosensitive members themselves in the form of endless belts for the purpose of achieving higher process speed or, especially in image forming apparatus having a plurality of developing assemblies and others, for the purpose of attaining the freedom in designing the arrangement of developing assemblies and others.

Image forming apparatus such as copying machines and printers making use of endless belts have various advantages as stated above. On the other hand, they also have some subjects for improvement.

For example, intermediate transfer belts are required to have a surface area not smaller than the image region, so that they are necessarily large in size and also required to have various properties such as resistance properties and surface properties, tending to result in a high production cost. They also have not necessarily a sufficient durability and tend to have to be frequently changed to new ones. As the result, this may raise the main-body price and running cost of copying machines and printers and also it may take more time and labor for their maintenance. In particular, because of market trends in recent years, it has increasingly become important to achieve lower prices and provide maintenance-free articles.

In addition, in order to form good color images, some problems must be solved which may occur because a plurality of colors are superimposed on the intermediate transfer belt.

One of them is a misregistration occurring between individual color images. In fine lines and characters, even a slight color misregistration tends to be conspicuous to provide a possibility of damaging image quality. The intermediate transfer belt is set across a plurality of shafts and is driven and rotated around them, where the tension applied to every part of the intermediate transfer belt is not necessarily uniform. Hence, the intermediate transfer belt may undergo a local elongation and, concurrent therewith, may cause a delicately uneven rotation. These are considered to come out as delicate color misregistration.

Another problem is occurrence of spots around line images.

A color image is formed by superimposing a plurality of toner images and hence has a larger quantity of toners per unit area than a monochromatic image. Especially in characters or letters and fine lines, toners are present in a large quantity on narrow lines. Moreover, individual color toners have electric charges with the same polarity and hence repulse one another electrostatically. Thus, they can be said to lie on the intermediate transfer belt in an unstable state.

Meanwhile, because of a difference in arcs drawn by the outer surface and inner surface of the intermediate transfer belt, produced when it passes the shafts over which it is set, the intermediate transfer belt elongates in the peripheral direction at its surface and in the vicinity thereof.

Thus, the toner images standing unstable and weak to external disturbance as stated above are disordered when the intermediate transfer belt passes the shafts, so that the spots around line images come to occur, as so considered.

Still another problem is half-tone image transfer performance. Faulty images tend to occur when the intermediate transfer belt has uneven resistance or uneven thickness.

In addition to these, the intermediate transfer belt always undergoes a tension and a repeated flexural elongation stress, and hence the intermediate transfer belt is required to have a material rigidity high enough to neither break nor crack even when used over a long period of time. The intermediate transfer belt made of resin also tends to cause what is called a creep, in which the above stress makes the belt elongate gradually with time in the peripheral direction. Any great change in size caused by the creep may make a difference from the original designing to aggravate color misregistration or may cause faulty images such as uneven halftone images. It may also cause a difficulty in the rotation of the intermediate transfer belt, acting as a great factor to shorten the life of the intermediate transfer belt.

For the achievement of cost reduction, which is another important subject, the intermediate transfer belt must be made thin-gage in order to reduce the quantity of materials constituting the belt, and also a production process having a smaller number of steps must be provided. Making the belt thin-gage also has the effect of less causing a transfer toner scatter and is an effective means, but on the other hand tends to cause a problem also in respect of durability.

Moreover, it is essential for the intermediate transfer belt to be provided, in its neighborhood, with a mechanism of applying a high voltage. Accordingly, as constituent materials therefor, high-safety materials are preferred that may fire or smoke with difficulty against any unforeseen accidents such as abnormal discharge and insulation failure.

However, satisfying all of these high image quality, high durability, low cost and safety involves technical difficulties.

Accordingly, studies are made on intermediate transfer belts made of resin which satisfy these characteristics at a higher level.

As for the transfer material carrying belt, it is not the case that images are directly transferred onto the belt. However, in order to achieve a high image quality, the transfer material carrying belt is required to satisfy the same characteristics as those for the intermediate transfer belt, e.g., uniform resistance, surface properties, cost reduction, durability and safety. The same also applies to the photosensitive belt, on the surface of which images are directly formed.

Various processes for producing endless belts used in the intermediate transfer belts and so forth are already known in the art. For example, Japanese Patent Application Laid-Open No. 3-89357 and No. 5-345368 disclose a process for producing a semiconducting belt by extrusion. Japanese Patent Application Laid-Open No. 5-269849 also discloses a process in which a belt is obtained by joining both ends of a sheet to bring it into a cylindrical form. Japanese Patent Application Laid-Open No. 9-269674 discloses a process in which a belt is obtained by forming a multi-layer coating film on a cylindrical substrate and finally removing the substrate. Also, Japanese Patent Application Laid-Open No. 5-77252 discloses a seamless belt obtained by centrifugal molding.

However, e.g., in the extrusion, the production of a thin-layer belt which enables reduction of cost and prevention of spots around line images involves considerable difficulties when the die gap of an extrusion die is merely set in the same size as the desired belt thickness to carry out extrusion. Even if possible, such extrusion tends to cause uneven thickness and, as an effect thereof, uneven electrical resistance. In the case when both ends of a sheet are joined, the difference in height and decrease in tensile strength at the joint tend to come into question. Also, processes making use of solvents as in cast molding, the coating and centrifugal molding require many steps of preparing a coating solution, coating the solution and removing the solvent, resulting in a high cost.

SUMMARY OF THE INVENTION

The present inventors propose a novel endless belt for electrophotography which has solved the problems discussed above and is different from conventional ones.

An object of the present invention is to provide an endless belt for electrophotography which is producible at a low cost and through a small number of steps and is rich in variety, and a process for its production.

Another object of the present invention is to provide an endless belt for electrophotography, and an image forming apparatus, which can obtain good color images with less color misregistration and less spots around line images.

Still another object of the present invention is to provide an endless belt for electrophotography which can be free from any changes in size and characteristics of the belt even with its repeated use and, after such use, can maintain the same characteristics as those at the initial stage, and to provide a process for its production and an image forming apparatus having such an endless belt.

The present invention provides an endless belt for electrophotography which is obtainable continuously by melt extrusion from a circular die; the endless belt comprising a layer containing a thermoplastic resin having a diphenyl sulfone structure represented by the following Formula (1)

(1)

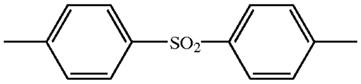

The present invention also provides a process for producing an endless belt for electrophotography; the process comprising the step of melt-extruding a thermoplastic resin having a diphenyl sulfone structure represented by the following Formula (1), from a circular die to produce the endless belt continuously (1)

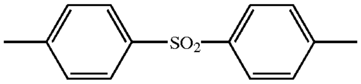

The present invention still also provides an image forming apparatus for electrophotography comprising an endless belt which is obtainable continuously by melt extrusion from a circular die;

the endless belt comprising a layer containing a thermoplastic resin having a diphenyl sulfone structure represented by the following Formula (1)

(1)

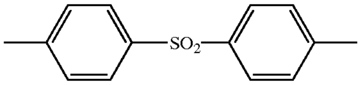

DESCRIPTION OF THE PREFERRED EMBODIMENTS

Figure 1:
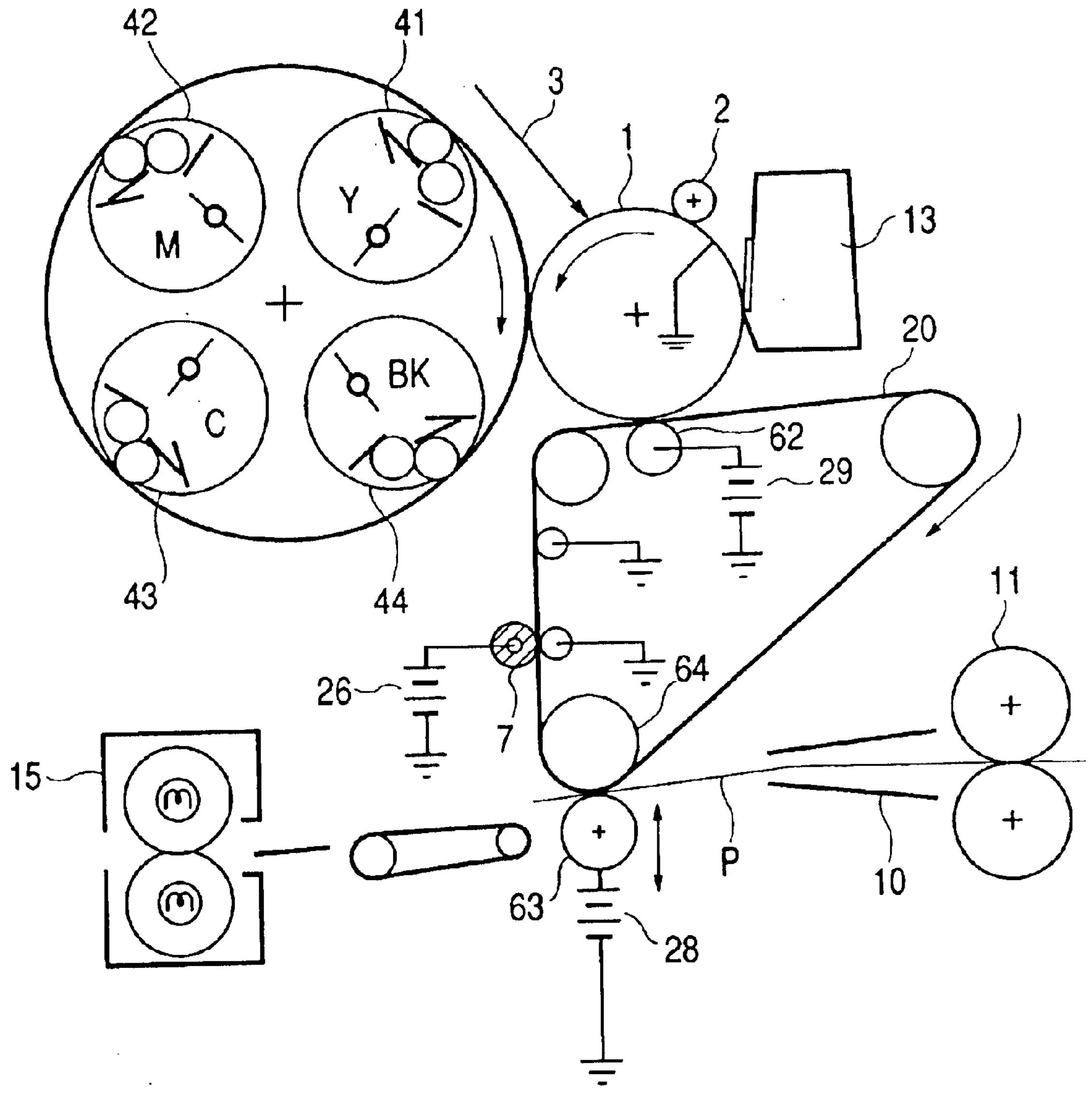
FIG. 1 is a schematic cross-sectional illustration of an example of an image forming apparatus making use of the endless belt of the present invention as an intermediate transfer member.

The endless belt of the present invention is obtainable continuously by melt extrusion from a circular die and also has a layer containing a thermoplastic resin having a diphenyl sulfone structure represented by the following Formula (1)

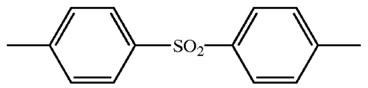

(1)

The reason why the present invention can be effective as stated previously will be set forth below.

In order for endless belts to less cause the spots around line images and satisfy the durability against repeated use as stated previously, they are required to have a high tensile modulus of elasticity and a high breaking strength, and also required to have a creep resistance not to cause any change in size in the peripheral direction even under application of a tension for a long term.

To attain such characteristics, materials constituting the endless belt and how to produce the endless belt are both very important.

As a means for satisfying such characteristics, the present inventors have discovered that it is most suitable to extrude the thermoplastic resin having a diphenyl sulfone structure represented by the above Formula (1), into an endless belt in the manner mentioned above. The resin having a diphenyl sulfone structure has good modulus of elasticity, breaking strength, creep resistance and heat resistance, and also have a flame retardancy at a high level. Then, the extrusion of this material by the production process of the present invention brings about an improvement of characteristics and can achieve very good performances required as endless belts such as the intermediate transfer belt, the transfer material carrying belt and the photosensitive belt. More specifically, the thermoplastic resin having a diphenyl sulfone structure represented by Formula (1) is melt-extruded and is simultaneously stretched. Hence, the product can be made thin-gage with ease without damaging the good properties inherent in the resin itself, bringing about the effect of cost reduction attributable to the material usable in a smaller quantity, the effect of more improvement in strength on account of the stretching, and the effect of less causing the uneven thickness and uneven resistance. Especially with regard to the color misregistration and spots around line images, these can greatly effectively be prevented on account of the thin-gage belt and the improvement in tensile modulus of elasticity. Also, since the endless belt can be produced continuously, the production process can be made simple and efficient, promising a very high effect of process cost reduction.

Thus, according to the present invention, a seamless endless belt having a high electrical resistance stability, a high durability and a high creep resistance and being not causative of the spots around line images and the firing or smoking in an abnormal condition, having a high safety, can be obtained at a low cost, and all the problems discussed previously can be solved. Using this endless belt, an intermediate transfer belt, a transfer material carrying belt and a photosensitive belt which have good characteristics can be obtained. Incidentally, in the case of the photosensitive belt, the endless belt of the present invention is used as a substrate.

The endless belt of the present invention may preferably have a thickness ranging from 40 μm to 300 μm. If it has a thickness smaller than 40 μm, its extrusion stability may lower to tend to cause uneven thickness and also tend to result in an insufficient durability and strength, so that the endless belt may break or crack in some cases. If on the other hand it has a thickness larger than 300 μm, the material is in a large quantity, resulting in a high cost and also a great difference in peripheral speed between the outer surface and inner surface of the endless belt at its portions put over the shafts to tend to cause spots around line images seriously. Moreover, the endless belt may have so excessively a high rigidity as to require a high driving torque, bringing about problems that the main body must be made large-size and involves a cost increase.

An embodiment of a process for producing the endless belt of the present invention will be described below. Embodiments are not limited to this process.

Figure 3:
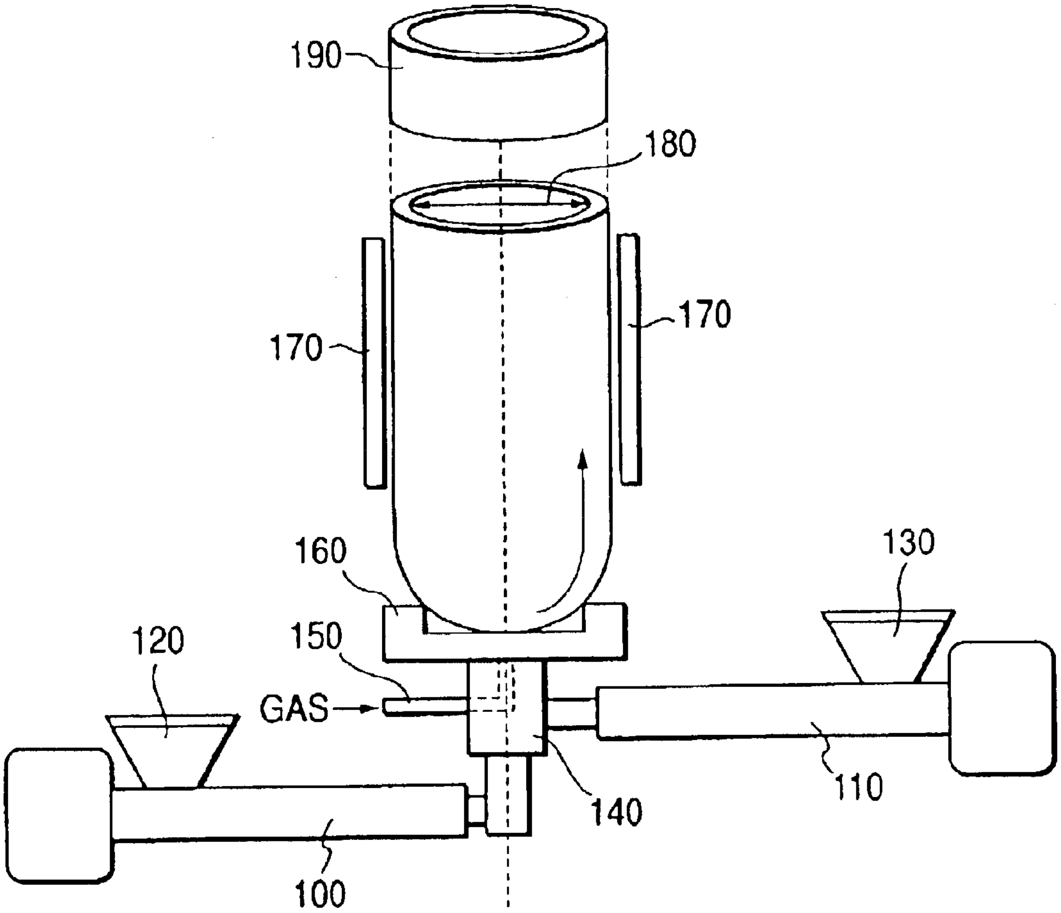
FIG. 3 is a schematic side elevation of an example of an extrusion apparatus for producing the endless belt of the present invention.

FIG. 3 shows an extrusion apparatus for producing the endless belt of the present invention. This apparatus consists basically of an extruder, an extruder die and a gas blowing unit. As shown in FIG. 3, the apparatus has extruders 100 and 110 so that a belt of double-layer configuration can be extruded. In the present invention, however, at least one extruder may be provided.

A single-layer endless belt can be produced by a process described below. First, an extrusion resin [the thermoplastic resin having a diphenyl sulfone structure represented by Formula (1)], a conducting agent and additives are premixed under the desired formulation and thereafter kneaded and dispersed to prepare an extrusion material, which is then put into a hopper 120 installed to the extruder 100. The extruder 100 has a preset temperature, extruder screw construction and so forth which have been so selected that the extrusion material may have a melt viscosity necessary for enabling the extrusion into an endless belt in the post step and also the materials can be dispersed uniformly one another.

The extrusion material is melt-kneaded in the extruder 100 into a melt, which then enters a circular die 140. The circular die 140 is provided with a gas inlet passage 150. Through the gas inlet passage 150, a gas is blown into the circular die 140, whereupon the melt having passed through the circular die 140 in a tubular form inflates while scaling up in the diametrical direction. Since the diameter is enlarged, this extrusion is called blown-film extrusion (i.e., inflation). The blown-film extrusion enables extrusion into thin films with ease, and is also readily achievable of an improvement in strength attributable to changes in orientation of resin, called a stretch effect. Thus, this is particularly preferred as a production process used in the present invention.

The gas to be blown here may be selected from air, nitrogen, carbon dioxide and argon. The extruded product having thus inflated into a cylinder is drawn upward while being cooled by a cooling ring 160. At this stage, the extruded product passes through the space defined by a dimension stabilizing guide 170, so that its final shape and dimensions are determined. This product is further cut in desired width, thus a seamless endless belt 190 of the present invention can be obtained.

The foregoing description relates to a single-layer belt. In the case of the endless belt of double-layer configuration, an extruder 110 is additionally provided as shown in FIG. 3. Simultaneously with the kneaded melt held in the extruder 100, a kneaded melt in the extruder 110 is sent to a double-layer circular die 140, and the two layers are scale-up inflated simultaneously, thus a double-layer belt can be obtained.

In the case of triple- or more layers, the extruder may be provided in the number corresponding to the number of layers. Examples of the endless belt of double-layer configuration consisting of a first layer 201 and a second layer

Figure 4:
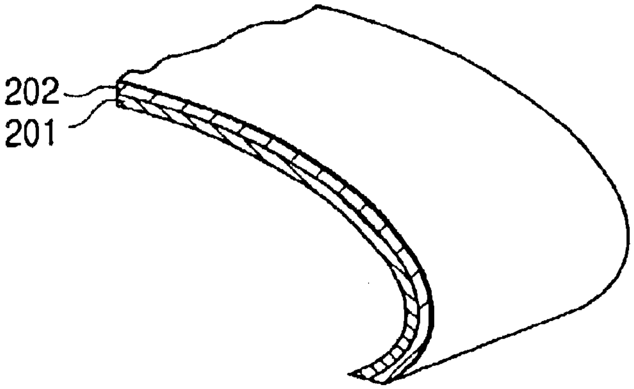
FIG. 4 is a partial cross-sectional perspective illustration of an intermediate transfer belt having a double-layer configuration according to the present invention.
Figure 5:
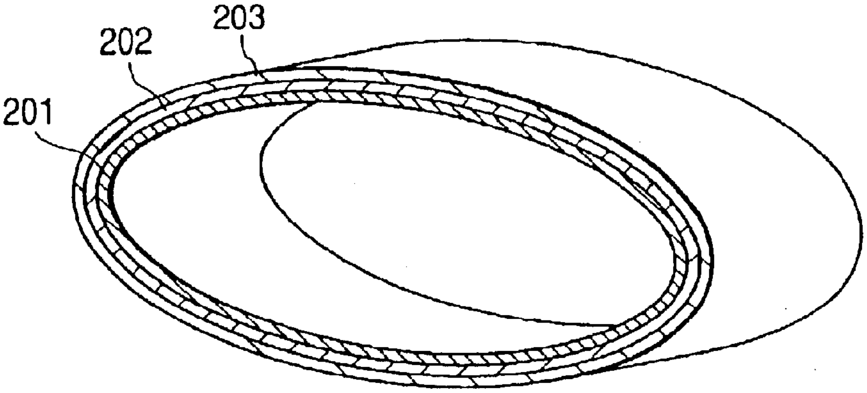
FIG. 5 is a perspective illustration of an intermediate transfer belt having a triple-layer configuration according to the present invention.
Figure 6:
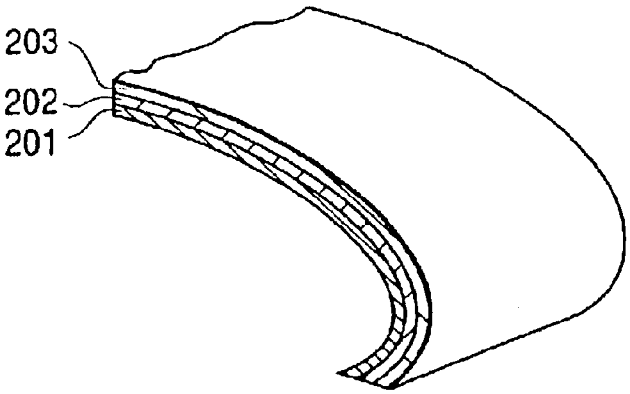
FIG. 6 is a partial cross-sectional perspective illustration of an intermediate transfer belt having a triple-layer configuration according to the present invention.

202 and that of triple-layer configuration consisting of a first layer 201, a second layer 202 and a third layer 203 are shown in FIG. 4, and FIGS. 5 and 6, respectively. Thus, the present invention makes it possible to extrude not only endless belts of single-layer configuration but also those of multi-layer configuration in a good dimensional precision through one step and also in a short time. The fact that the extrusion can be made in a short time well suggests that mass production and low-cost production can be made.

In the case when the endless belt has a multi-layer configuration, at least one layer may contain the thermoplastic resin having a diphenyl sulfone structure represented by Formula (1).

Figure 7:
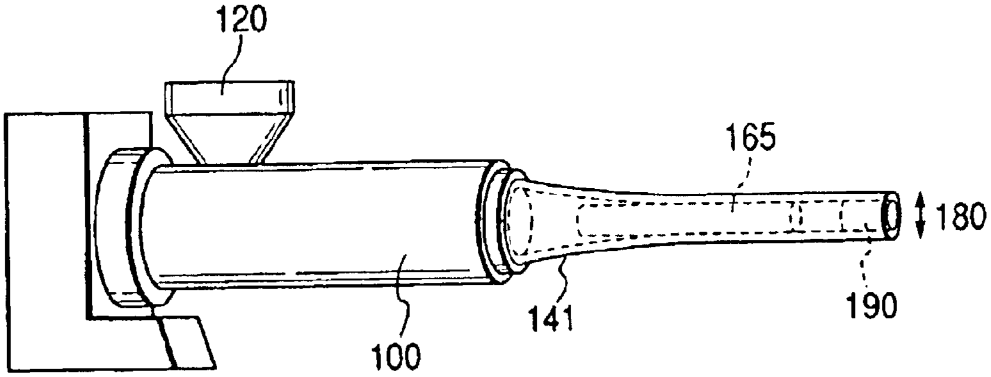
FIG. 7 is a schematic perspective illustration of another example of an extrusion apparatus for producing the endless belt of the present invention.

FIG. 7 shows another extrusion apparatus for producing the endless belt of the present invention. The extrusion material put into a hopper 120 is melt-kneaded in an extruder 100 and extruded from a circular die 141. The melt thus excluded into a cylinder is stretched while being tensed by a take-off mechanism (not shown) provided on the extension line of a cooling mandrel 165. It comes into contact with the inner wall of the cooling mandrel 165 in the form of a cylindrical film having substantially the desired thickness and diameter, to become cool and solidify, followed by cutting. Thus, a seamless endless belt 190 of the present invention can be obtained.

The thickness of the cylindrical film thus extruded may preferably be smaller than the width of a gap (slit) of the circular die. Stated specifically, the former may preferably be not larger than ⅓, and particularly preferably not larger than ⅕, of the latter as thickness ratio.

Similarly, the diameter proportion between the circular die and the extruded cylindrical film, i.e., the proportion of external diameter of the cylindrical film at the time it has reached a shape dimension 180 after extrusion with respect to external diameter of the die slit of the circular die 140 or 141 may preferably be within the range of from 50% to 400% as external diameter proportion.

These values represent the state of stretch of the material. If the thickness ratio is larger than ⅓, the film tends to stretch insufficiently, tending to cause difficulties such as low strength, uneven resistance and uneven thickness. As for the external diameter proportion, if it is more than 400% or less than 50%, the film has stretched in excess, resulting in a low production stability or making it difficult to ensure the thickness necessary for the present invention. In the present invention, the blown-film extrusion (inflation) is preferred as stated previously. From this point of view, the external diameter of the resultant belt may preferably be from more than 100% to 400% or less, and particularly preferably from 105% to 400%, of the die slit external diameter of the circular die used.

In the endless-belt production process of the present invention, in order to attain the desired dimensions by scale-up inflating the extruded product while blowing air, or by drawing it under application of a tension, the extrusion material may preferably have a breaking extension of 2.0% or more and a tensile breaking strength of 40 MPa or above. If the material has a breaking extension less than 2.0%, the extruded product may instantaneously solidify when it is shifted to a cooling step from a molten state after it has passed through the step of extrusion, so that it may be scale-up inflated to the desired dimensions with difficulty. Also, if the material has a tensile breaking strength below 40 MPa, the extruded product may have no body and can not maintain the cylindrical shape at the time of scale-up inflation, tending to case wrinkles, strain and unevenness when it is drawn upward while being scale-up inflated as shown in FIG. 3.

Uniformities of electrical resistance of the endless belt of the present invention and electrical resistance of the interior of the belt are important factors for maintaining the performance of the endless belt.

In the case of the intermediate transfer belt, if the transfer belt has a too high electrical resistance, a sufficient transfer electric field can not be imparted at the time of primary transfer and secondary transfer, tending to result in faulty transfer. If on the other hand it has a too low electrical resistance, electrical discharge may locally occur, also making it hard to form the transfer electric field. Also, if the resistance in the belt is non-uniform, the local electrical discharge, i.e., leak may occur, and electric currents applied at the time of primary transfer and secondary transfer may escape therethrough to make it hard to obtain the necessary transfer electric field. In the case of transfer making use of the transfer material carrying belt, too, the same as the foregoing may apply. Also, in the case of the photosensitive belt, a too high electrical resistance tends to cause a problem of a rise of residual potential.

Accordingly, according to the present invention, the endless belt may preferably have a resistance of from $1\times10^{0}$ to $1\times10^{14}$ Ω. Also, in order to prevent such leak, faulty transfer and local uneven transfer from occurring, the difference in resistance at every part of the endless belt may preferably be within 100 times (maximum value/minimum value) in respect of both the surface-direction resistance and the thickness-direction resistance.

The chief material resin included in extrusion materials used in the endless belt of the present invention contains as its constituent material at least the thermoplastic resin having a diphenyl sulfone structure represented by the following Formula (1)

(1)

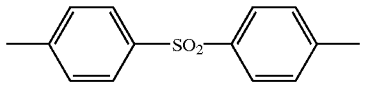

The thermoplastic resin having such a structure may preferably include, but not particularly limited to, polysulfones having a structural unit represented by the following Formula (2) and polyether sulfones having a structural unit represented by the following Formula (3). Also, any of these resins having a diphenyl sulfone structure may be used in plurality in the form of a mixture.

(2)

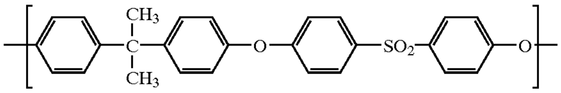

(3)

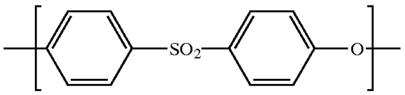

In the present invention, additional resin(s) may optionally be mixed in addition to the above resin. In such an instance, the resin having a diphenyl sulfone structure may be held in a proportion of 30% by weight or more, and more preferably 50% by weight or more, of the whole resins. If it is in a too small proportion, the present invention can not be well effective in some cases.

There are no particular limitations on the additional resin(s) mixable in the endless belt of the present invention. Preferred are those having melting temperature close to that of the resin having a diphenyl sulfone structure.

In the present invention, in order to control the electrical resistance of the endless belt, a conductive agent may be added as long as the present invention can be effective. Carbon black is commonly used, but not necessarily limited to it. Besides, the conductive agent may include conductive metal oxides, metal salts, and conductive macromolecules.

Taking account of extrusion performance and mechanical properties of the endless belt, the conductive agent may be added in an amount of 30% by weight or less based on the weight of the resins. This, however, does not necessarily apply when the conductive agent has a large density. In an instance where the resistance is controlled with the resin material itself, its amount is not limitative to the foregoing.

Methods of measuring physical properties concerning the present invention are shown below.

Tensile Breaking Strength:

The tensile break strength and breaking extension are measured according to JIS K7113 and JIS K7127, in conformity with the nature of the extrusion material and the resin used in the extrusion material.

Resistance:

As measuring equipments, an ultra-high resistance meter R8340A (manufactured by Advantest Co.) is used as a resistance meter, and Sample box TR42 for ultra-high resistance measurement (manufactured by Advantest Co.) as a sample box. The main electrode is 25 mm in diameter, and the guard-ring electrode is 41 mm in inner diameter and 49 mm in outer diameter.

A sample is prepared in the following way. First, the endless belt is cut in a circular of 56 mm in diameter by means of a punching machine or a sharp knife. The circular cut piece obtained is fitted, on its one side, with an electrode over the whole surface by forming a Pt—Pd deposited film and, on the other side, fitted with a main electrode of 25 mm in diameter and a guard electrode of 38 mm in inner diameter and 50 mm in outer diameter by forming Pt—Pd deposited films. The Pt—Pd deposited films are formed by carrying out vacuum deposition for 2 minutes using Mild Sputter E1030 (manufactured by Hitachi Ltd.). The one on which the vacuum deposition has been carried out is used as a measuring sample.

Measured in a measurement atmosphere of 23° C./55% RH. The measuring sample is previously kept left in the like atmosphere for 12 hours or longer. Measurement is made under a mode of discharge for 10 seconds, charge for 30 seconds and measurement for 30 seconds and at an applied voltage of 1 to 1,000 V.

The applied voltage may arbitrarily be selected within the range of from 1 to 1,000 V which is magnitude of the voltage applied when the endless belt is actually used in an image forming apparatus. It may be selected in accordance with the resistance value, thickness and insulation breakdown strength of the sample. Also, as long as the electrical resistance at a plurality of spots, measured at any one-point voltage of the above applied voltage, is included in the resistance range defined in the present invention, the resistance is judged to be within the resistance range intended in the present invention.

An example of an image forming apparatus employing the endless belt of the present invention as an intermediate transfer member is schematically shown in FIG. 1.

The apparatus shown in FIG. 1 is a full-color image forming apparatus (copying machine or laser beam printer) utilizing an electrophotographic process.

Reference numeral 1 denotes a drum-shaped electrophotographic photosensitive member (hereinafter "photosensitive drum") serving as a first image bearing member, which is rotatingly driven at a prescribed peripheral speed (process speed) in the direction of an arrow.

The photosensitive drum 1 is, in the course of its rotation, uniformly charged to prescribed polarity and potential by means of a primary charging assembly 2, and then exposed to light 3 by a exposure means (not shown; e.g., a color-original image color-separating/image-forming optical system, or a scanning exposure system comprising a laser scanner that outputs laser beams modulated in accordance with time-sequential electrical digital pixel signals of image information). Thus, an electrostatic latent image is formed which corresponds to a first color component image (e.g., a yellow color component image) of the intended color image.

Next, the electrostatic latent image is developed with a first-color yellow developer (toner) Y by means of a first developing assembly (yellow color developing assembly 41). At this stage, second to fourth developing assemblies (magenta color developing assembly 42, cyan color developing assembly 43 and black color developing assembly 44) each stand unoperated and do not act on the photosensitive drum 1, and hence the first-color yellow toner image is not affected by the second to fourth developing assemblies.

An intermediate transfer belt 20 is rotatingly driven at a prescribed peripheral speed in the direction of an arrow. The first-color yellow toner image formed and held on the photosensitive drum 1 passes through a nip formed between the photosensitive drum 1 and the intermediate transfer belt 20, in the course of which it is successively intermediately transferred to the periphery of the intermediate transfer belt 20 (primary transfer) by the aid of an electric field formed by a primary transfer bias applied to the intermediate transfer belt 20 through a primary transfer roller 62. The photosensitive drum 1 surface from which the first-color yellow toner image has been transferred is cleaned by a cleaning assembly 13.

Subsequently, the second-color magenta toner image, the third-color magenta toner image and the fourth-color black toner image are sequentially similarly transferred superimposingly onto the intermediate transfer belt 20. Thus, the intended full-color toner image is formed.

Reference numeral 63 denotes a secondary transfer roller, which is provided in such a way that it is axially supported in parallel to a secondary transfer opposing roller 64 and stands separable from the bottom surface of the intermediate transfer belt 20.

The primary transfer bias for sequentially superimposingly transferring the first- to fourth-color toner images from the photosensitive drum 1 to the intermediate transfer belt 20 is applied from a bias source 29 in a polarity (+) reverse to that of each toner. The voltage thus applied is, e.g., in the range of from +100 V to +2 kV. In the step of primary transfer, the secondary transfer roller 63 may also be set separable from the intermediate transfer belt 20.

The full-color toner images formed on the intermediate transfer belt 20 are transferred to a second image bearing member, transfer material P, in the following way: The secondary transfer roller 63 is brought into contact with the intermediate transfer belt 20 and simultaneously the transfer material P is fed at a prescribed timing from a paper feed roller 11 through a transfer material guide 10 until it reaches a contact nip formed between the intermediate transfer belt 20 and the secondary transfer roller 63, where a secondary transfer bias is applied to the secondary transfer roller 63 from a power source 28. The transfer material P to which the toner images have been transferred are guided into a fixing assembly 15 and are heat-fixed there.

After the toner images have been transferred to the transfer material P, a charging member 7 for cleaning is brought into contact with the intermediate transfer belt 20, and a bias with a polarity reverse to that of the photosensitive drum 1 is applied, whereupon electric charges with a polarity reverse to that of the photosensitive drum 1 are imparted to toners not transferred to the transfer material P and remaining on the intermediate transfer belt 20 (i.e., transfer residual toners). Reference numeral 26 denotes a bias power source. The transfer residual toners are electrostatically transferred to the photosensitive drum 1 at the nip on the photosensitive drum 1 and the vicinity thereof, thus the intermediate transfer member (intermediate transfer belt 20) is cleaned.

Figure 2:
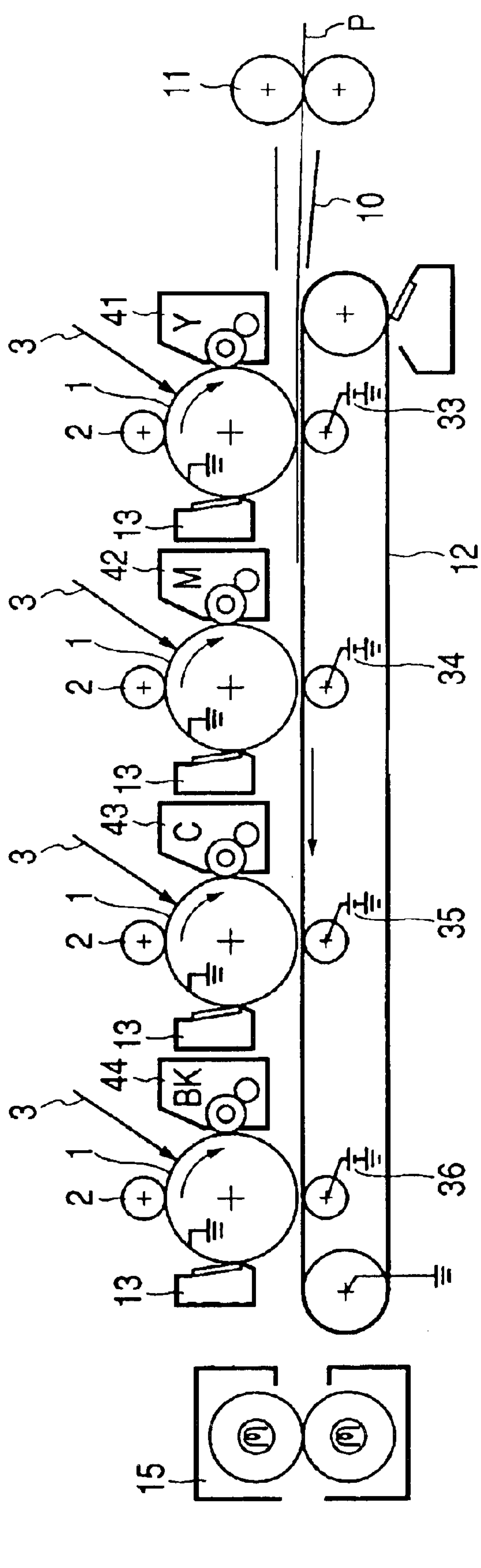
FIG. 2 is a schematic cross-sectional illustration of an example of an image forming apparatus making use of the endless belt of the present invention as a transfer material carrying belt.

An example of an image forming apparatus employing the endless belt of the present invention as a transfer material carrying member is schematically shown in FIG. 2. In FIG. 2, a transfer material P is carried on a transfer material carrying belt 12, and is transported in the direction of an arrow shown in the drawing. At the same time, individual color toner images are sequentially transferred thereto from a photosensitive drum 1. In FIG. 2, reference numerals 1, 2, 3, 10, 11, 13, 15, 41, 42, 43 and 44 and a letter symbol P denote the same as those in FIG. 1; and 33 to 36, transfer means.

In the case when the endless belt of the present invention is used as a substrate for the photosensitive belt, there are no particular limitations on the photosensitive layer on the substrate and other various means necessary for forming images, such as charging means and developing means.

In the present invention, without regard to whether or not the endless belt is used as a substrate for the photosensitive belt, a photosensitive drum containing fine powder of polytetrafluoroethylene (PTFE) in at least its outermost layer may preferably be used because a higher transfer efficiency can be achieved. This is presumably because the incorporation of PTFE lowers surface energy of the photosensitive drum outermost layer to bring about an improvement of releasability of the toner.

The present invention will be described below in greater detail by giving Examples. In the following Examples, "part(s)" is part(s) by weight.

EXAMPLE 1

| | |
|---|---|
| Polysulfone | 100 parts |
| Conductive carbon black | 16 parts |

The above materials were kneaded by means of a twin-screw extruder, and the additive such as carbon black was well uniformly dispersed in the binder so as to provide the desired electrical resistance, thus an extrusion material (1) was obtained in the form of pellets of about 2 mm in diameter. Next, this extrusion material (1) was put into the hopper 120 of the single-screw extruder 100 shown in FIG. 3, and was extruded with heating to form a melt. The melt was subsequently brought to the circular die 140 for extruding a cylindrical single-layer product, having a diameter of 120 mm and a die gap of 1 mm. Then, air was blown from the gas inlet passage 150 while extruding the melt from the die, to scale-up inflate the extruded product into a cylindrical extruded product of 190 mm in diameter and 160 $\mu$m in thickness as final shape dimensions 180. This product was further cut in a belt width of 320 mm to obtain a seamless endless belt type intermediate transfer belt 190. This is designated as intermediate transfer belt (1).

The electrical resistance of this intermediate transfer belt (1) under application of 100 V was 2×10 Ω. Also, the electrical resistance of the intermediate transfer belt (1) was measured at four spots in its peripheral direction and at two spots in its axial direction at each position of the former, eight spots in total, and any scattering of electrical resistance in one endless belt was examined, where the scattering of measurements at the eight spots was within one figure in respect of both the surface-direction resistance and the thickness-direction resistance. Scattering in the measurement of thickness at the same positions was within 160 $\mu$m plus-minus 15 $\mu$m upon visual observation of the intermediate transfer belt (1), none of foreign matter or faulty extrusion such as granular structure and fish eyes was seen on its surface. Also, the tensile break strength and breaking extension of the extrusion material (1) were 75 MPa and 10%, respectively.

The intermediate transfer belt (1) obtained was set in the full-color image forming apparatus shown in FIG. 1. Using two color toners of cyan-magenta and cyan-yellow, respectively, blue and green character images and line images were printed on 80 g/m$^2$ paper in an environment of 23° C./60% RH.

The respective images were visually observed to make evaluation on color misregistration and spots around line images. As a result, there were no problems on the both, showing good results.

Next, an A4 full-color image 50,000-sheet continuous running test was made while cleaning the intermediate transfer belt by a cleaning-at-primary-transfer method in which electric charges having a polarity reverse to the normal charge were imparted to the secondary transfer residual toners to return them to the photosensitive member.

After the running, very slight spots around line images and color misregistration were seen compared with initial-stage images but were not particularly problematic, and good images were obtainable. Neither faulty images and faulty drive due to the creep nor toner filming occurred, and also no problems were seen on cracking, scrape, wear and so forth. Thus, the belt was judged to have a sufficient durability.

EXAMPLE 2

| | |
|---|---|
| Polysulfone | 80 parts |
| Polyether sulfone | 20 parts |
| Conductive carbon black | 16 parts |

The above materials were kneaded by means of a twin-screw extruder to obtain a uniform kneaded product, which was designated as an extrusion material (2). Next, this was continuously extruded by means of the extruder shown in FIG. 7, using a circular extrusion die 141 having a diameter of 200 mm and a die gap of 1.2 mm. The cylindrical extruded product obtained was cut to obtain an intermediate transfer belt (2) of 185 mm in diameter, 320 mm in belt width and 125 $\mu$m in thickness.

The tensile break strength and breaking extension of the extrusion material (2) were 80 MPa and 6%, respectively. The electrical resistance of the intermediate transfer belt (2) under application of 100 V was $3\times10^5$ Ω.

The scattering of electrical resistance was within one figure in respect of both the surface-direction resistance and the thickness-direction resistance. The scattering of thickness was also as good as 125 μm plus-minus 10 μm.

Next, using this intermediate transfer belt (2), printing was tested in the same manner as in Example 1 to obtain good results like those in Example 1.

EXAMPLE 3

| | |
|---|---|
| Polyether sulfone | 80 parts |
| Polybutylene terephthalate | 20 parts |
| Conductive carbon black | 15 parts |

The above materials were kneaded by means of a twin-screw extruder to obtain a uniform kneaded product, which was designated as an extrusion material (3). The subsequent procedure of Example 1 was repeated to obtain an intermediate transfer belt (3) of 190 mm in diameter, 320 mm in belt width and 155 μm in thickness.

The electrical resistance of this intermediate transfer belt (3) under application of 100 V was $6\times10^5$ Ω. The scattering of electrical resistance was within one figure in respect of both the surface-direction resistance and the thickness-direction resistance. The scattering of thickness was also as good as 155 μm plus-minus 11 μm. The tensile break strength and breaking extension of the extrusion material (3) were 71 MPa and 11%, respectively.

Next, using this intermediate transfer belt (3), printing was tested in the same manner as in Example 1 to obtain good results like those in Example 1.

EXAMPLE 4

| | |
|---|---|
| Polysulfone | 100 parts |
| Conductive carbon black | 10 parts |

The above materials were kneaded and dispersed in the same manner as in Example 1 to obtain an extrusion material (4) in the form of pellets of about 2 mm in diameter. The subsequent procedure of Example 1 was repeated except for using a circular extrusion die having a diameter of 200 mm and a die gap of 0.6 mm, to obtain a transfer material carrying belt (1) of 280 mm in diameter, 250 mm in belt width and 150 μm in thickness.

This transfer material carrying belt (1) had an electrical resistance of $8\times10^{11}$ Ω under application of 100 V. Its scattering of thickness was 150 μm plus-minus 24 μm, and scattering of electrical resistance was within one figure in respect of both the surface-direction resistance and the thickness-direction resistance. The tensile break strength and breaking extension of the extrusion material (4) were 72 MPa and 12%, respectively.

This transfer material carrying belt was set in the apparatus shown in FIG. 2, and printing was tested in the same pattern and manner as in Example 1.

After the running, very slight spots around line images and color misregistration were seen compared with initial-stage images but were not particularly problematic, and good images were obtainable. Neither faulty images and faulty drive due to the creep nor toner filming occurred, and also no problems were seen on cracking, scrape, wear and so forth. Thus, the belt was judged to have a sufficient durability.

COMPARATIVE EXAMPLE 1

| | |
|---|---|
| Low-density polyethylene | 100 parts |
| Conductive carbon black | 15 parts |

The above materials were kneaded and dispersed by means of a twin-screw extruder to obtain a uniform kneaded product, which was designated as an extrusion material (5). The subsequent procedure of Example 1 was repeated to obtain an intermediate transfer belt (4) of 190 mm in diameter, 320 mm in belt width and 140 μm in thickness.

The electrical resistance of this intermediate transfer belt (4) under application of 100 V was $6\times10^6$ Ω. The scattering of electrical resistance was within one figure in respect of both the surface-direction resistance and the thickness-direction resistance. The scattering of thickness was 140 μm plus-minus 38 μm. The tensile break strength and breaking extension of the extrusion material (5) were 30 MPa and 250%, respectively.

Next, using this intermediate transfer belt (4), printing was tested in the same manner as in Example 1. As a result, both the color misregistration and the spots around line images occurred seriously at the initial stage. The color misregistration and spots around line images became more serious with progress of running and also uneven images occurred. Hence the running test was stopped on 10,000th sheet. Thus, this intermediate transfer belt was found to have insufficient strength and durability.

What is claimed is:

1. An endless belt for use in an electrophotographic apparatus, to which a toner image on a photosensitive member of the electrophotographic apparatus is transferred by applying a first transfer bias and from which the toner image is transferred to an image-receiving material by applying a second transfer bias, the belt having a single-layer structure, having a resistance of $1\times10^0$ to $1\times10^{14}$ Ω and comprising a conductive agent and a thermoplastic resin, wherein the thermoplastic resin has a diphenyl sulfone structure represented by the following Formula (1):

(1)

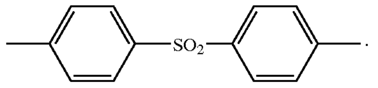

2. An endless belt according to claim 1, wherein said thermoplastic resin having a diphenyl sulfone structure is a thermoplastic resin having a structural unit represented by the following Formula (2):

(2)

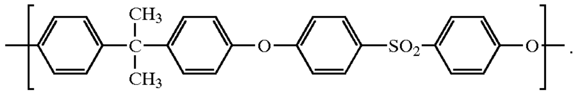

3. An endless belt according to claim 1, which has a thickness of from 40 μm to 300 μm.

4. An endless belt according to claim 1, which has a maximum value of a surface-direction resistance that is not greater than 100 times a minimum value of said surface-direction resistance.

5. An endless belt according to claim 1, which has a maximum value of a thickness-direction resistance that is not greater than 100 times a minimum value of said thickness-direction resistance.

6. An endless belt according to claim 1, which is an intermediate transfer belt.

7. An endless belt according to claim 1, which is a transfer material carrying belt.

8. An image forming apparatus for electrophotography comprising:

a photosensitive member;

an endless belt according to claim 1; and means for transferring a toner image formed on the photosensitive member to the endless belt under an application of a first transfer bias; and means for transferring the toner image from the endless belt to an image-receiving material under an application of a second transfer bias.

9. An endless belt according to claim 1, wherein said thermoplastic resin having a diphenyl sulfone structure is a thermoplastic resin having a structural unit represented by the following Formula (3):

(3)

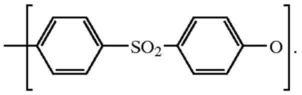

* * * * *

UNITED STATES PATENT AND TRADEMARK OFFICE

CERTIFICATE OF CORRECTION

PATENT NO. : 6,852,400 B2
DATED : February 8, 2005
INVENTOR(S) : Akihiko Nakazawa et al.

It is certified that error appears in the above-identified patent and that said Letters Patent is hereby corrected as shown below:

Title page, Item [54] and Column 1, line 1,
Title, "BELT ELECTROPHOTOGRAPHY," should read -- BELT FOR ELECTROPHOTOGRAPHY, --.

Title page,
Item [56], References Cited, OTHER PUBLICATIONS, last reference, "Wek" should read -- Week --.

Column 12,
Line 10, "2x10Ω." should read -- $2x10^5Ω$. --; and
Line 20, "15μm upon" should read -- 15μm. Upon --.

Column 13,
Line 4, "$3x10^{5Ω.}$" should read -- $3x10^5Ω$. --.

Column 16,
Line 17-21, "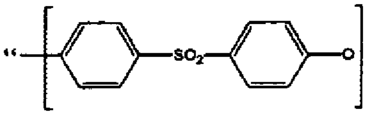" should read

--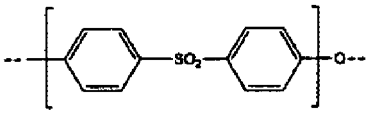.

Signed and Sealed this

Nineteenth Day of July, 2005

JON W. DUDAS
*Director of the United States Patent and Trademark Office*